(12) United States Patent
Mori et al.

(10) Patent No.: US 8,599,470 B2
(45) Date of Patent: Dec. 3, 2013

(54) SUSPENDED PARTICLE DEVICE AND METHOD FOR DRIVING SAME

(75) Inventors: Shunsuke Mori, Hitachi (JP); Yoshiro Mikami, Hitachiota (JP); Toshiaki Kusunoki, Tokorozawa (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 14 days.

(21) Appl. No.: 13/189,626

(22) Filed: Jul. 25, 2011

(65) Prior Publication Data

US 2012/0019897 A1 Jan. 26, 2012

(30) Foreign Application Priority Data

Jul. 26, 2010 (JP) .................................. 2010-167290

(51) Int. Cl.
*G02B 26/00* (2006.01)
*G09G 3/34* (2006.01)

(52) U.S. Cl.
USPC .......................................... 359/296; 345/107

(58) Field of Classification Search
USPC ......... 359/296; 345/84, 107, 105; 430/32, 34, 430/38; 204/450, 600
See application file for complete search history.

(56) References Cited

U.S. PATENT DOCUMENTS

| | | | |
|---|---|---|---|
| 4,442,019 A | 4/1984 | Marks | |
| 5,296,974 A * | 3/1994 | Tada et al. ..................... | 359/885 |
| 6,621,541 B1 * | 9/2003 | Choi .............................. | 349/113 |
| 7,116,466 B2 * | 10/2006 | Whitesides et al. .......... | 359/296 |
| 7,580,025 B2 * | 8/2009 | Nakai et al. ................... | 345/107 |
| 7,656,576 B2 * | 2/2010 | Suwabe et al. ................ | 359/296 |
| 2005/0185104 A1 | 8/2005 | Weisbuch et al. | |
| 2005/0190431 A1 | 9/2005 | Matsuda | |
| 2007/0164983 A1 | 7/2007 | Hamaguchi | |
| 2009/0316254 A1 | 12/2009 | Higashida et al. | |
| 2010/0014150 A1 | 1/2010 | Higashida et al. | |
| 2010/0047593 A1 | 2/2010 | Higashida et al. | |
| 2010/0309544 A1 | 12/2010 | Nomura et al. | |
| 2011/0013260 A1 | 1/2011 | Ohno et al. | |

FOREIGN PATENT DOCUMENTS

| | | |
|---|---|---|
| JP | 53-144893 | 12/1978 |
| JP | 2005-156811 | 6/2005 |

* cited by examiner

*Primary Examiner* — Tuyen Tra
(74) *Attorney, Agent, or Firm* — Antonelli, Terry, Stout & Kraus, LLP.

(57) ABSTRACT

A suspended particle device is realized which enables control of the amount of light transmitted through a prescribed area, without any complicated switching circuit on a substrate. A suspension, containing charged particles and a disperse medium, is filled between an A-substrate and a B-substrate, and first and second electrodes are formed on the A-substrate. A DC voltage is applied across the first and second electrodes, to localize the charged particles on the second electrode side. Subsequently, an AC voltage is applied across the first and second electrodes to orient, while maintaining the localized state of the charged particles, the charged particles along a direction of an electric field. Light transmittance is lower in an area where the charged particles are present than in an area without charged particles, whereas, in the area where the charged particles are present, the light transmittance can be controlled by adjusting the AC voltage.

11 Claims, 14 Drawing Sheets

SUSPENDED PARTICLE DEVICE AND METHOD FOR DRIVING SAME

CLAIM OF PRIORITY

The present application claims priority from Japanese Patent Application JP 2010-167290 filed on Jul. 26, 2010, the content of which is hereby incorporated by reference into this application.

FIELD OF THE INVENTION

The present invention relates to a light control device in which a driving voltage is applied to particles present between electrodes and driving control performed therein and, particularly, to technology effectively applicable to a suspended particle device (hereinafter also referred to as an "SPD").

BACKGROUND OF THE INVENTION

Great hopes are placed on light control devices using an SPD in the field of applications such as building materials aimed at energy saving through incident sunbeam control and display devices and optical devices using light transmission and reflection control functions. An SPD is a device whose optical characteristics vary between when no voltage is applied thereto and when a voltage is applied thereto. Generally, in an SPD, electrodes are formed on transparent substrates disposed to mutually face and a suspension containing light control particles (hereinafter also referred to simply as "particles") which are dispersed therein and which react to an electric field is provided between the substrates and between the electrodes.

The light control particles to be filled in an SPD are those which show optical anisotropy for absorption and reaction. Such light control particles include those which are caused to show optical anisotropy by their anisotropic shapes. Hence, particles whose aspect ratio is not 1 and which are rod-shaped, needle-shaped or shaped like flat plates are used as light control particles.

When no voltage is applied, the light control particles in a suspension are engaged in Brownian motion to be oriented randomly, so that light incident on the suspension is absorbed and scattered to be blocked without being transmitted.

When a voltage is applied, on the other hand, the light control particles in a suspension are affected by dielectric polarization caused by an electric field and are uniformly oriented along the direction of the electric field. In this state, light incident on the suspension is modulated by the oriented light control particles. According to Japanese Patent Laid-Open No. Sho 53 (1978)-144893, for example, when the direction of incident light is the same as the direction of the electric field and the direction along which the particles are oriented, the incident light can be transmitted through the suspension to achieve high transmittance and such a state is referred to as an open state.

Another method for controlling a light control area in an SPD is disclosed in Japanese Patent Laid-Open No 2005-156811. In the method, plural electrode pairs are formed on a substrate or on a spacer disposed between substrates and control is effected by selecting an electrode pair across which a voltage is to be applied.

When controlling a light control area using prior-art SPD technology, however, it is necessary to select an electrode pair across which a voltage is to be applied out of plural electrodes. For light-control area control, therefore, it is necessary to perform passive matrix drive or active matrix drive. Furthermore, to realize more continuous light-control area control, it is necessary to increase the number of electrodes. Increasing the number of electrodes, terminals and matrix drive elements makes the SPD structure more complicated resulting in increasing the number of production processes to eventually increase the production cost.

Such a cost increase can be avoided by developing SPD technology which makes it possible to continuously control a light control area between electrodes. An object of the present invention is to provide technology for realizing light-control area control between electrodes by focusing attention on light control particle material, SPD structure, and SPD driving method.

SUMMARY OF THE INVENTION

The present invention addresses the above problem mainly by the following means.

(1) A suspended particle device includes a pair of substrates disposed to face each other with a suspension containing charged particles and a disperse medium filled therebetween and with an electrode pair formed on the suspension side of one of the pair of substrates. In the suspended particle device, light control is effected by applying a DC voltage across the electrode pair to localize the particles and subsequently applying an AC voltage across the electrode pair to maintain the localized state of the localized particles. In the suspended particle device, the charged particles preferably have optical anisotropy.

(2) A suspended particle device includes a pair of substrates disposed to face each other with a suspension containing charged particles and a disperse medium filled therebetween and with an electrode pair formed on the suspension side of one of the pair of substrates. In the suspended particle device: the charged particles have optical anisotropy; an outer side of one of the pair of substrates is attached with a polarizer; and light control is effected by applying a DC voltage across the electrode pair to localize the charged particles and subsequently applying an AC voltage across the electrode pair to maintain the localized state of the localized charged particles. In the suspended particle device, it is preferable that: in a state with the AC voltage applied, the suspension in an area where the charged particles are localized has a polarization effect with an absorption axis thereof aligned in a prescribed direction; and the absorption axis of the suspension and an absorption axis of the polarizer are orthogonal to each other.

According to the present invention, a light control area can be controlled without requiring any complicated switching circuit to be formed on a substrate, so that a light control device having a simple structure and being capable of controlling a light control area can be realized.

DESCRIPTION OF THE PREFERRED EMBODIMENTS

Embodiments will be described in detail below with reference to drawings. Note that, in all the drawings referred to in describing the following embodiments/components having identical functions are assigned identical reference symbols and duplication of their description may be avoided.

First Embodiment

First, to make the present invention easier to understand, the basic structure of a suspected particle device (SPD) studied by the present inventors will be described. Note that, of the two substrates disposed to face each other in the SPD, the one provided with electrode pairs to form electric fields in a suspension filled between the substrates is referred to as an "A-plate" and the other provided with no electrode pairs is referred to as a "B-plate." In the present application, the A-plate and B-plate are described as an A-substrate and B-substrate, respectively, each formed of a transparent sheet-like supporting base of, for example, a resin film such as polyethylene terephthalate (PET), polycarbonate (PC), or cyclo-olefin polymer (COP) or glass.

Figure 1:
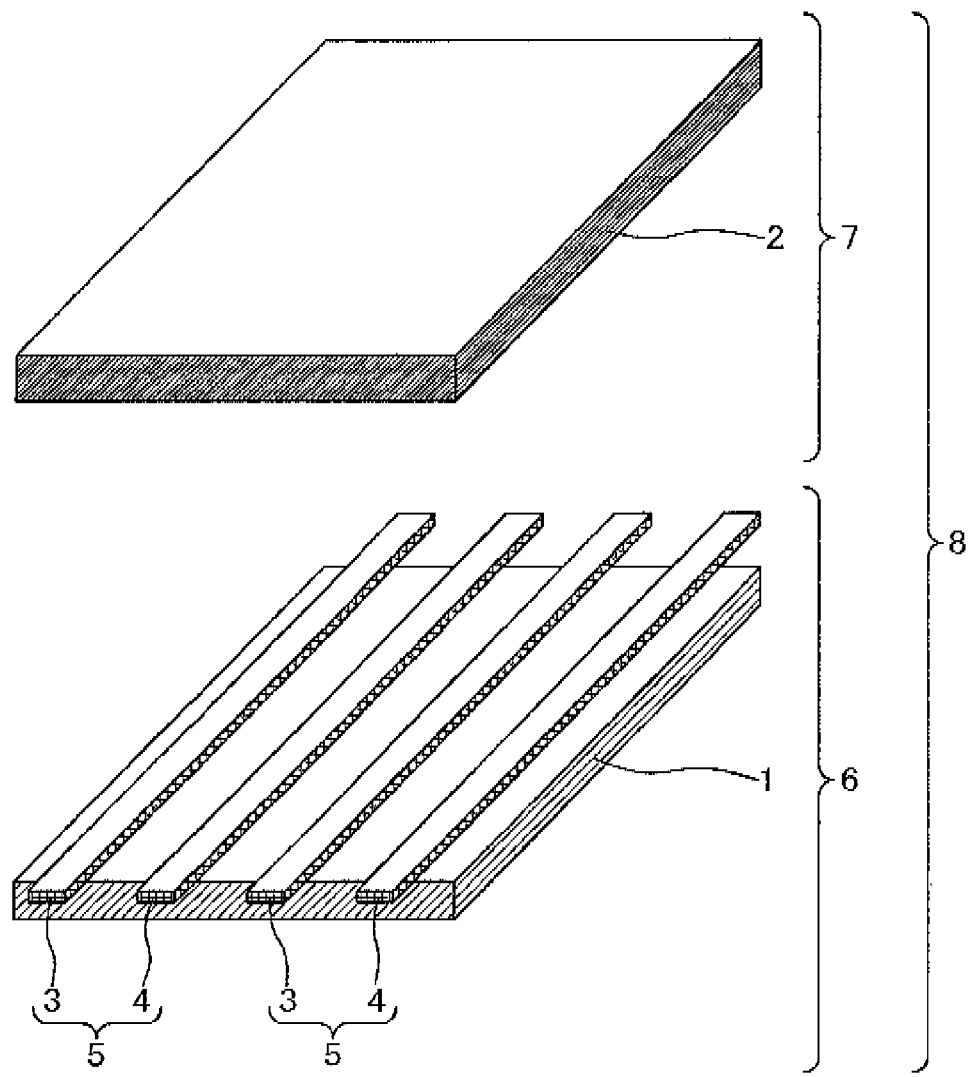
FIG. 1 is an exploded perspective view schematically showing a principal portion of a suspended particle device (SPD) according to the present invention.
Figure 2A:
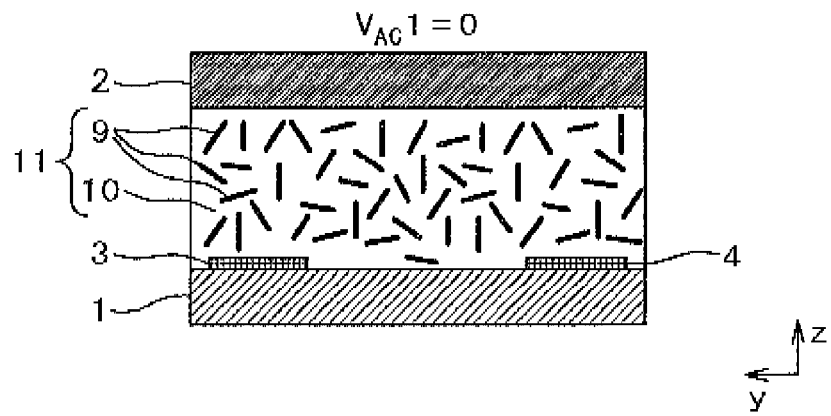
FIGS. 2A to 2C are sectional views in a y-z plane showing a portion including a driving electrode pair of the SPD shown in FIG. 1, FIG. 2A showing a state with no voltage applied, FIG. 2B showing a state with a medium AC voltage applied and FIG. 2C showing a state with a high AC voltage applied.
Figure 2B:
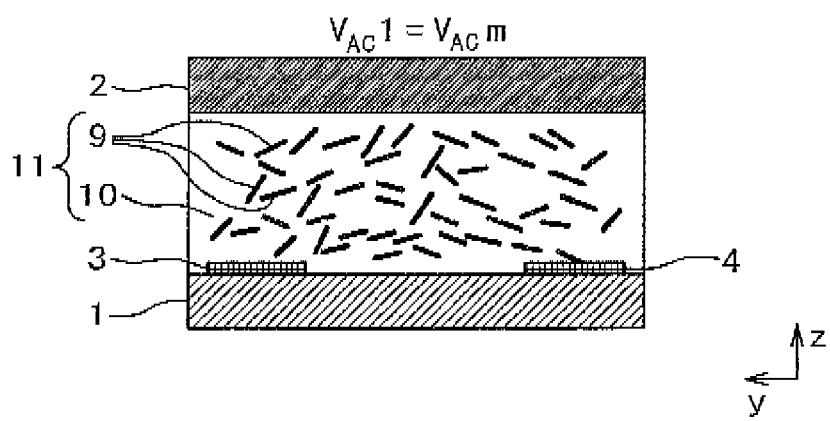
Figure 2C:
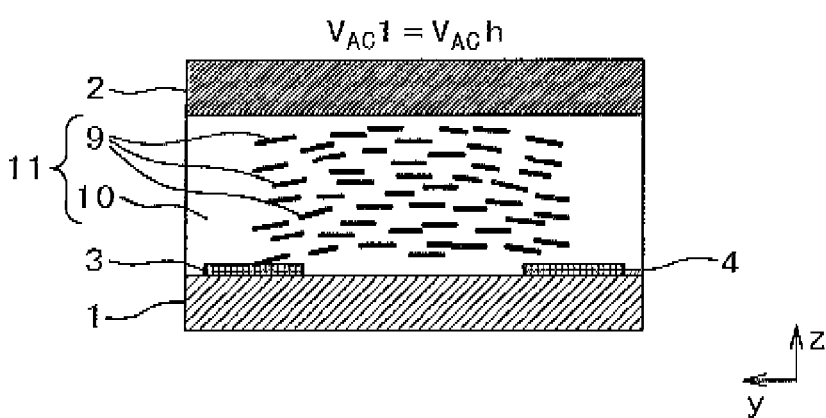

FIG. 1 is an exploded perspective view schematically showing a principal portion of the SPD studied by the present inventors. FIGS. 2A to 2C are sectional views in a y-z plane showing a portion including a pair of driving electrodes of the SPD in an assembled state. In the following, first an A-plate denoted in FIG. 1 by reference numeral 6 will be described including how it is formed. Referring to FIG. 1, plural driving electrode pairs 5 each comprised of an X-electrode 3 and a Y-electrode 4 are arranged in a stripe pattern on the A-substrate 1. The X-electrodes 3 and Y-electrodes 4 are successively alternately arranged along a lateral direction. The X-electrodes 3 and Y-electrodes 4 each have a width of, for example, 10 μm and the distance between each pair of X-electrode 3 and Y—electrode 4 is, for example, 15 μm. Note that these dimensions may largely differ depending on applications. In the present example, the voltage to drive the X-electrode 3 and Y-electrode 4, being described later, is several tens of volts (effective value).

The driving electrode pairs 5 are transparent electrodes formed of indium tin oxide (ITO) which is a transparent conductor. The driving electrode pairs 5 may also be formed of a transparent conductor such as tin oxide or zinc oxide or a metallic single-layer or multi-layer film, for example, of chrome. Even though, in the present embodiment, the driving electrodes are arranged in a stripe pattern, they may be arranged differently, for example, in a circular pattern or in a pattern of a letter.

Next, the A-plate and B-plate are disposed to face each other, sealant containing spacer beads is applied to mutually facing portions along the edges (not shown) of the two plates, and the two plates are bonded together thereby forming a space to be filled with a suspension (hereinafter also referred to as a "suspension space"). The suspension space may be maintained by spraying the spacer beads between the two plates. In cases where the X-electrodes 3 and Y-electrodes 4 each have a width of about 10 μm and the distance between each pair of X-electrode 3 and Y-electrode 4 is about 15 μm, the thickness of the suspension space is, for example, 20 μm or less.

A suspension 11 used in the present embodiment contains light control particles 9 and a disperse medium 10. The light control particles 9 are anisotropically shaped and display optical anisotropy with varied absorbance attributable to their orientation. The aspect ratio of their shape is other than 1 and they are negatively charged. The light control particles 9 have, for example, a rod-like shape with a long-axis length of several hundred nm and an aspect ratio of, for example, 5 to 30. The light control particles 9 may be formed of a carbon-based material such as polyperiodides or carbon black, a metallic material such as copper, nickel, iron, cobalt, chrome, titanium, or aluminum, or particles of an inorganic compound, for example, silicon nitride or titanium nitride. They are charged positively or negatively. Materials such as carbon black and metals are not charged to a specific polarity themselves, but they can be charged as prescribed by being coated with material having property of being charged to a specific polarity.

The disperse medium 10 contained in the suspension 11 is a liquid copolymer of a (meth) acrylic acid ester oligomer. Preferably, the disperse medium 10 has a viscosity which allows the light control particles 9 to be suspended, fluid and movable, has a high resistance, is affinitive with neither the supporting base nor the driving electrodes, has a reflective index close to that of the supporting base, and has a permittivity different from that of the light control particles. A difference in reflective index between the disperse medium 10 and the light control particles 9 can be utilized, in orienting the light control particles 9 as being described later, as a driving force in an AC electric field. In the present embodiment, the specific permittivity of the disperse medium 10 is 4 to 5.

The suspension 11 is filled in the suspension space through end portions left unbonded by sealant of both plates by making use of capillary action. After the suspension 11 is filled between the two plates, the unbonded end portions of the two plates are sealed by bonding them together using a sealant. This isolates the suspension 11 from outside air.

Figure 3:
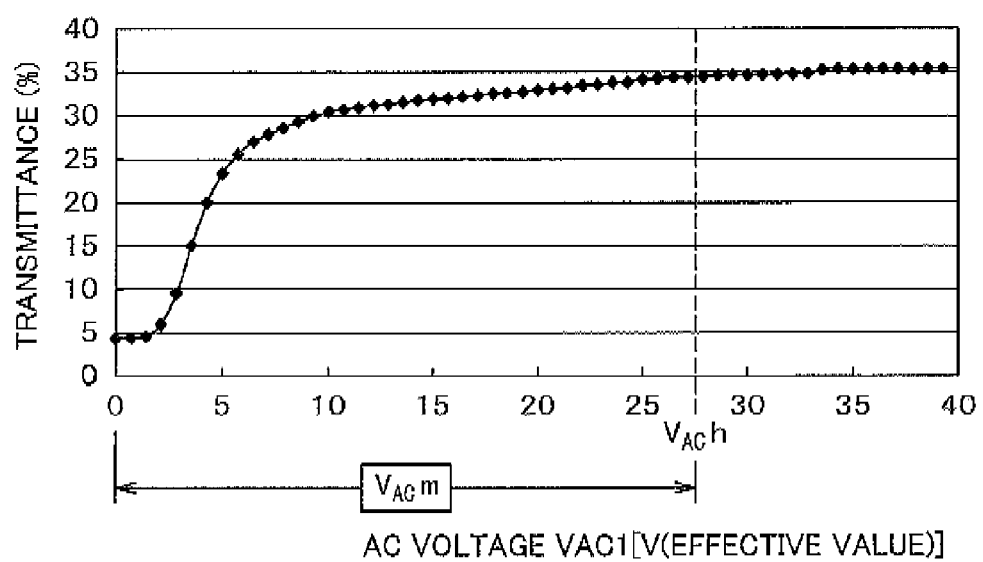
FIG. 3 is a graph showing variation in transmittance with respect to AC voltage $V_{AC}1$ in the SPD shown in FIG. 1.

FIG. 3 shows variation in transmittance of light transmitted from the A-substrate 1 side to the B-substrate 2 side with respect to AC voltage $V_{AC}1$ applied across the X-electrode 3 and the Y-electrode 4. When no voltage is applied across the X-electrode 3 and the Y-electrode 4 ($V_{AC}1=0$), the light control particles 9 are, as shown in FIG. 2A, randomly oriented to absorb and scatter light, so that transmittance is low.

When an AC voltage $V_{AC}1$ is applied across the X-electrode 3 and the Y-electrode 4, as shown in FIG. 2B, the degree of orientation of the light control particles 9 along the direction of the electric field increases. This causes the amount of light transmitted through clearances between the light control particles 9 to increase resulting in an increased transmittance where AC voltage $V_{AC}1=V_{AC}m$.

When an adequately high AC voltage $V_{AC}h$ is applied across the X-'electrode 3 and the Y-electrode 4, the light control particles 9 are, as shown in FIG. 2C, almost entirely oriented along the direction of the electric field. Where AC voltage $V_{AC}1$ is $V_{AC}h$ or higher, the light control particles 9 are adequately oriented along the direction of the electric field, so that the transmittance does not increase much.

Figure 4:
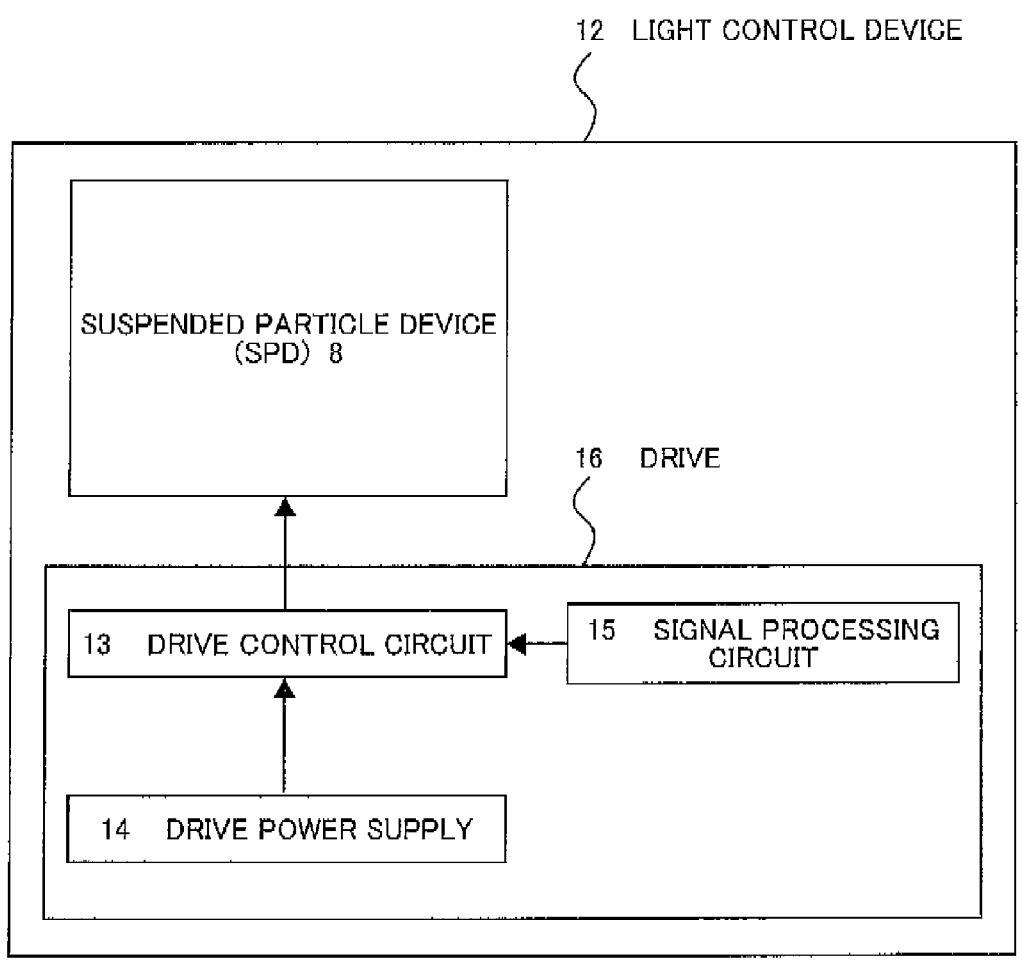
FIG. 4 illustrates a configuration of a light control device using the SPD shown in FIG. 1.

FIG. 4 illustrates an example configuration of a light control device 12 having an SPD 8. The light control device 12 is provided with a drive 16 which includes the SPD 8, a drive control circuit 13 and a drive power supply 14 for driving the X-electrodes 3 and Y-electrodes 4 of the SPD 8, and a signal processing circuit 15 which processes input signals for controlling a light control area and the state of light control. The light control device 12 may be provided with an external signal input device for inputting an external environment information signal concerning, for example, incident light and temperature to the signal processing circuit 15.

Figure 5:
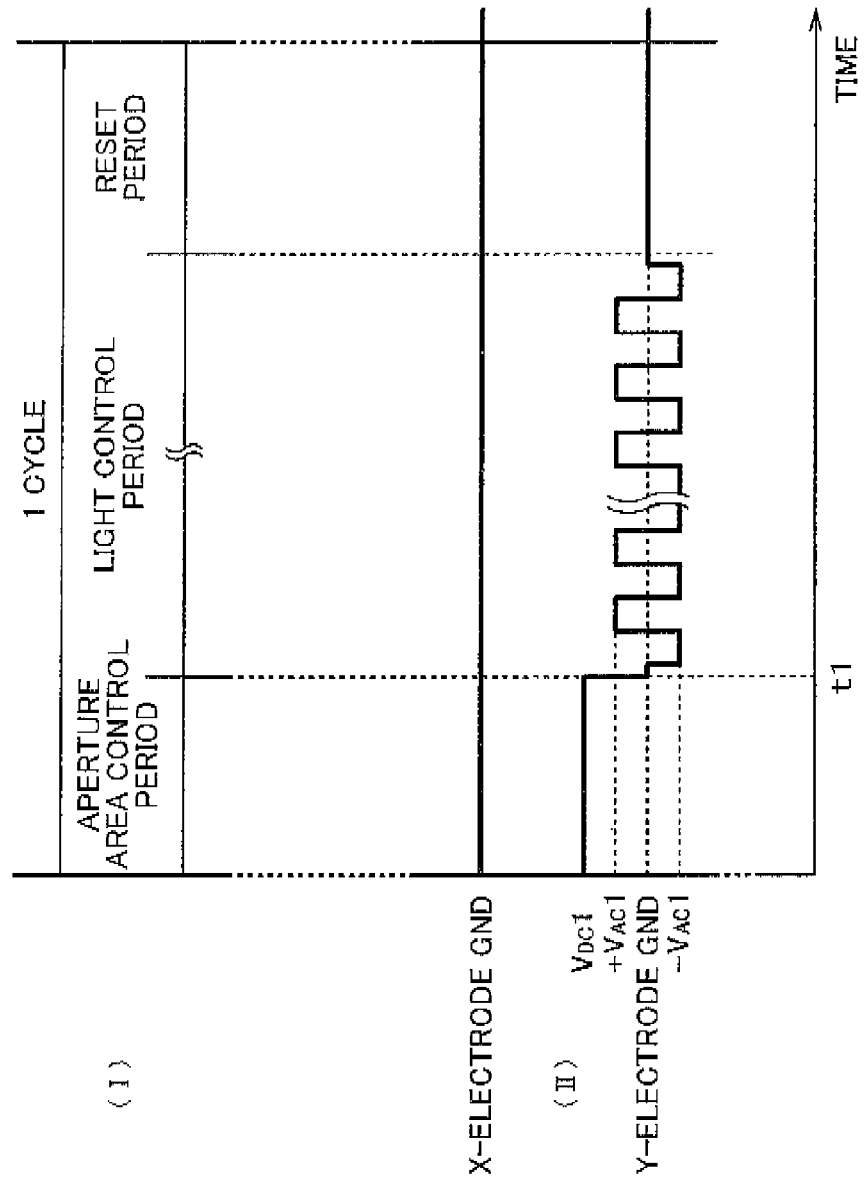
FIG. 5 illustrates the composition of a driving method for controlling a light control area in the SPD shown in FIG. 1 and a corresponding driving waveform.

Next, the driving method used in the present embodiment will be described. In FIG. 5, the composition of a driving cycle used in the driving method is shown in an upper part (I) and a corresponding driving waveform is shown in a lower part (II). The driving cycle is composed of an aperture area control period, a light control period, and a reset period. In the aperture area control period, DC voltage $V_{DC}1$ is applied to the 1-electrode 4 and a DC electric field is formed between the X-electrode 3 and the Y-electrode 4. Since the light control particles 9 dispersed between the electrodes are negatively charged, they are localized on the 1-electrode 4 side.

At this time, by adjusting DC voltage $V_{DC}1$, electric field $E_{DC}1$ formed between the electrodes, and DC electric field formation time t1, it is possible to localize the light control particles 9 in a desired area on the Y-electrode 4 side. Namely, aperture width d1 shown in FIG. 8 can be controlled by adjusting t1 so as to determine a gray scale value.

After localizing the light control particles 9 in a desired area on the Y-electrode 4 side, a driving waveform of voltage $V_{AC}1$ is applied to the Y-electrode 4 at a frequency of 50 to 1000 Hz in the light control period thereby forming an AC electric field between the X-electrode 3 and the Y-electrode 4. This causes the light control particles 9 localized on the Y-electrode 4 side to be retained where they are in a state of being oriented along the direction of the electric field. In cases where the frequency of the AC electric field is extremely low, the light control particles 9 may move between the electrodes or their orientation may vary by being affected by the frequency of the AC electric field. The frequency of the AC electric field is, therefore, required to be high enough to keep the light control particles 9 oriented along the direction of the electric field between the electrodes. Hence, the frequency is desired to be not lower than the critical flicker frequency (CFF). It is preferably 15 Hz or higher.

$V_{AC}1$ equals voltage $V_{AC}k$ which allows the light control particles 9 to be kept localized on the Y-electrode 4 side without returning into a dispersed state by Brownian motion. The degree of orientation of the light control particles 9 can be controlled by adjusting AC voltage $V_{AC}1$ within the relationship of $V_{AC}k \leq V_{AC}1 \leq V_{AC}h$. The driving waveform to form the AC electric field may be a sine wave, rectangular wave (square wave) or triangular wave. Or, AC waveforms whose polarities alternate every half period may be simultaneously applied to the X-electrode 3 and the Y-electrode 4.

In the reset period according to the driving method of the present embodiment, voltage application to the electrodes is discontinued to bring the light control particles 9 localized on the Y-electrode 4 side in a state of being oriented along the direction of the electric field back into a dispersed state between the electrodes. Referring to FIG. 5, even though DC voltage $V_{DC}1$ in the aperture area control period is higher in absolute value than the wave height value $V_{AC}1$ of the AC voltage in the light control period, it only represents an example and there can be cases where DC voltage $V_{DC}1$ is smaller than the wave height value $V_{AC}1$ of the AC voltage. The magnitude of DC voltage $V_{DC}1$ is determined taking into consideration DC electric field formation time t1.

FIGS. 6 to 11 illustrate the movement of the light control particles 9 and light control operations taking place in the SPD 8 when the driving method according to the present invention is used. Note that FIGS. 6 to 11 are sectional views showing one pair of X-electrode 3 and Y-electrode 4 out of those shown in FIG. 1.

Figure 6:
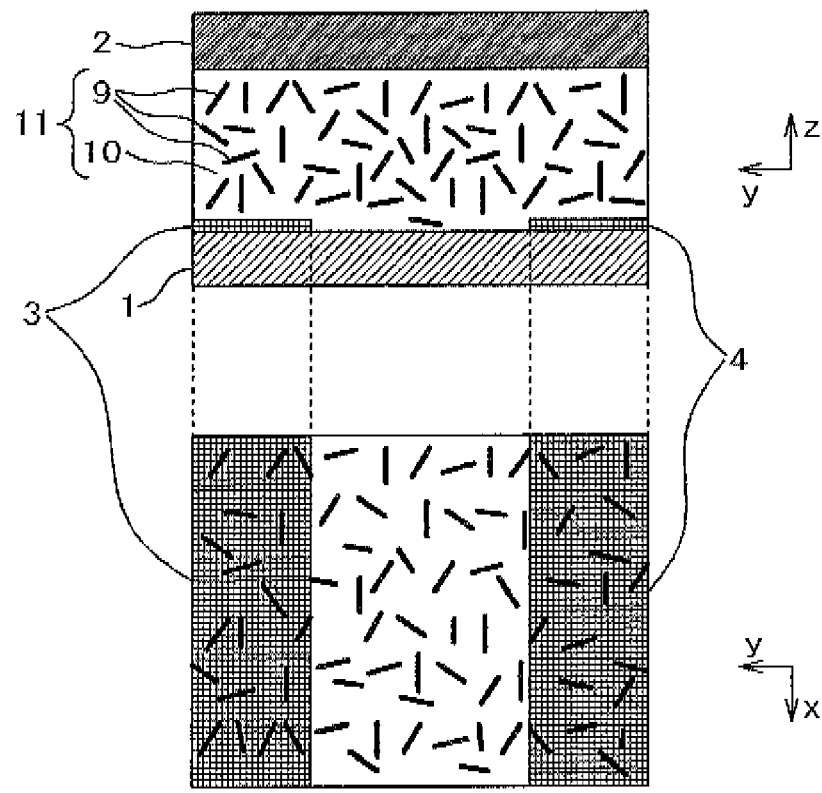
FIG. 6 is a diagram showing an internal state of an SET according to a first embodiment before being driven.
Figure 7:
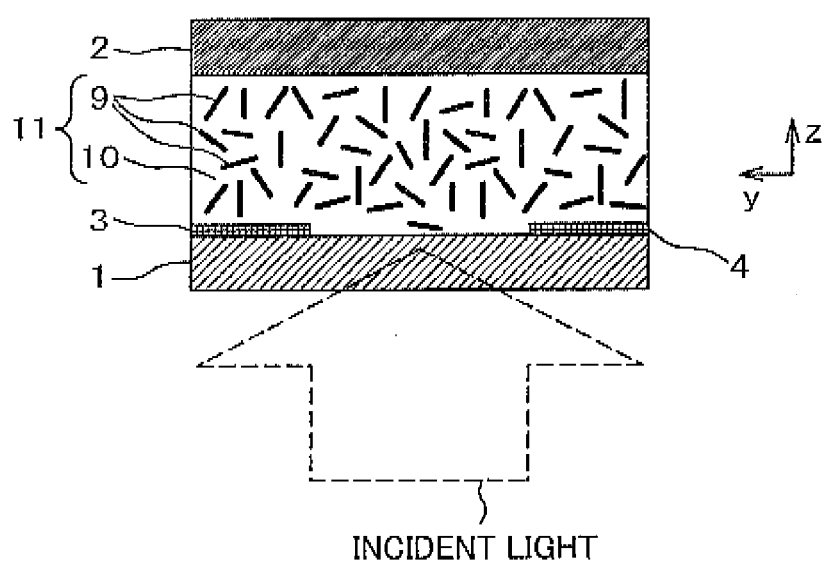
FIG. 7 is a diagram showing the optical path of incident light on the SPD of the first embodiment before being driven.

FIG. 6 shows the SPD 8 in a state before being driven. As shown, the light control particles are almost uniformly dispersed, in an unregulated state, between the electrodes. As shown in FIG. 7, incident light incident from behind is absorbed and blocked by the light control particles.

Figure 8:
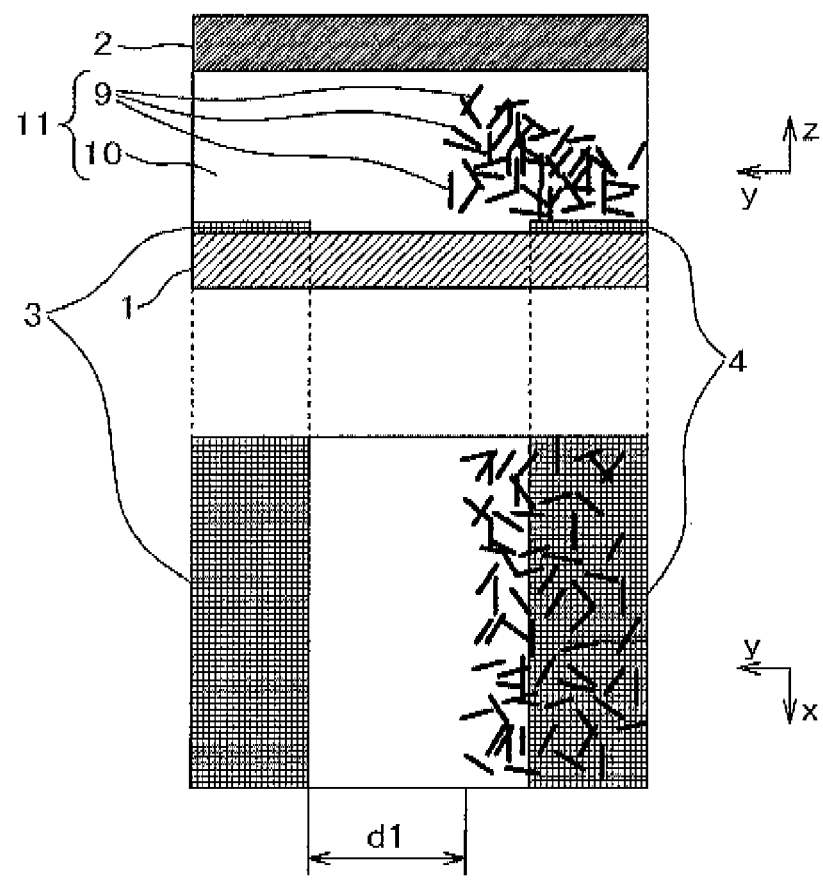
FIG. 8 is a diagram showing an internal state of the SPD of the first embodiment during an aperture area control period.
Figure 9:
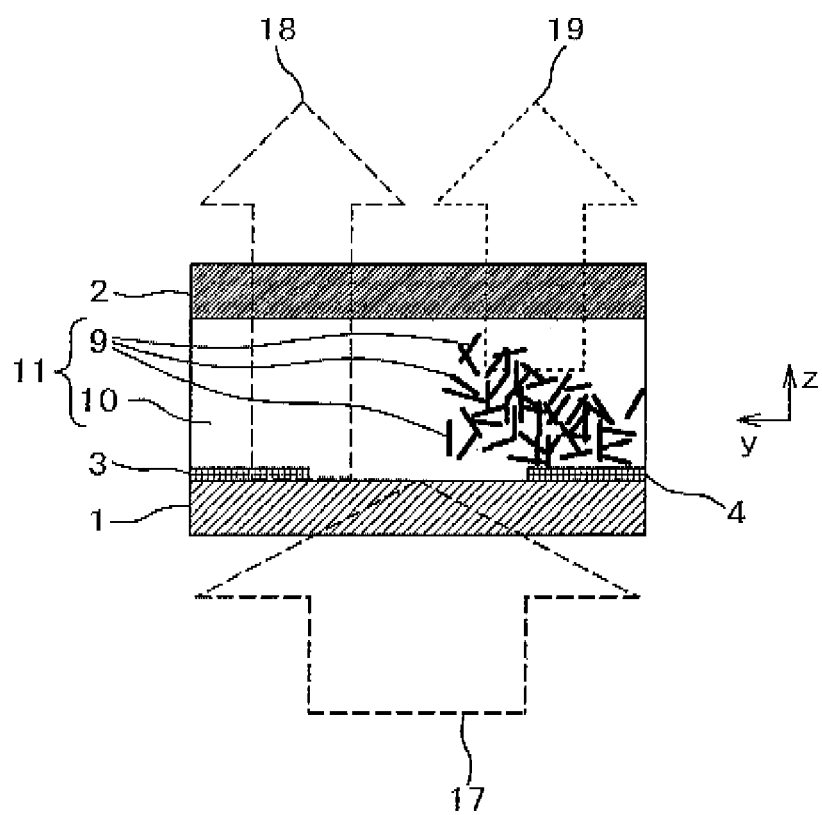
FIG. 9 is a diagram showing the optical path of incident light on the SPD of the first embodiment during the aperture area control period.

FIG. 8 shows the SPD 8 in a state during the aperture area control period. As shown, the light control particles 9 being affected by the DC electric field are localized on the Y-electrode 4 side with almost no light control particles 9 located on the X-electrode 3 side. Hence, as shown in FIG. 9, light 18 transmitted on the X-electrode 3 side shows high transmittance whereas light 19 transmitted on the Y-electrode 4 side shows low transmittance. The aperture width d1 shown in FIG. 8 can be controlled by adjusting t1 shown in FIG. 5.

Figure 10:
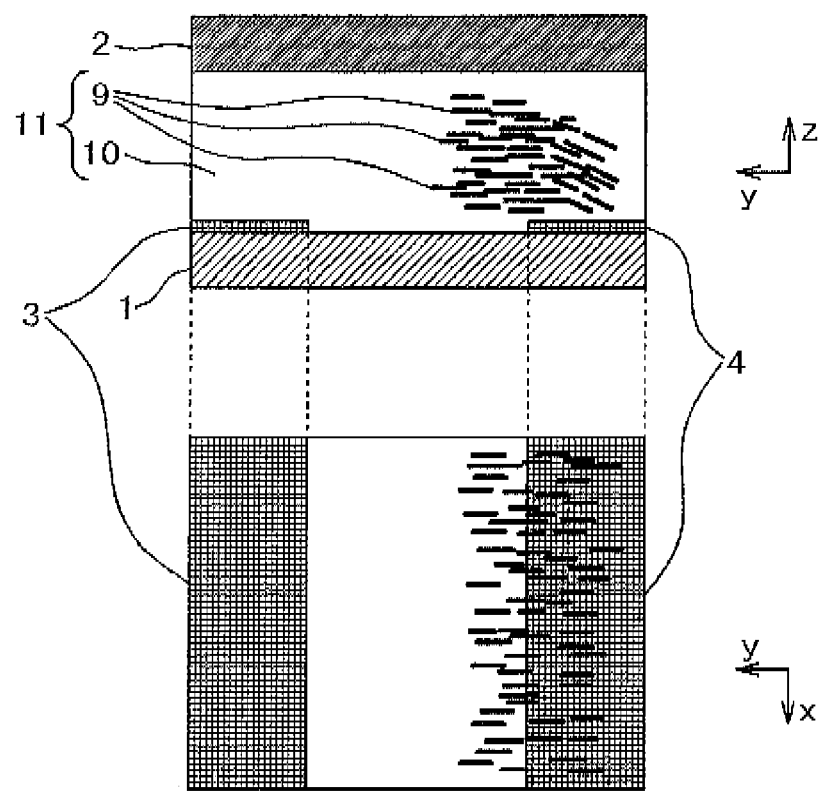
FIG. 10 is a diagram showing an internal state of the SPD of the first embodiment during a light control period.
Figure 11:
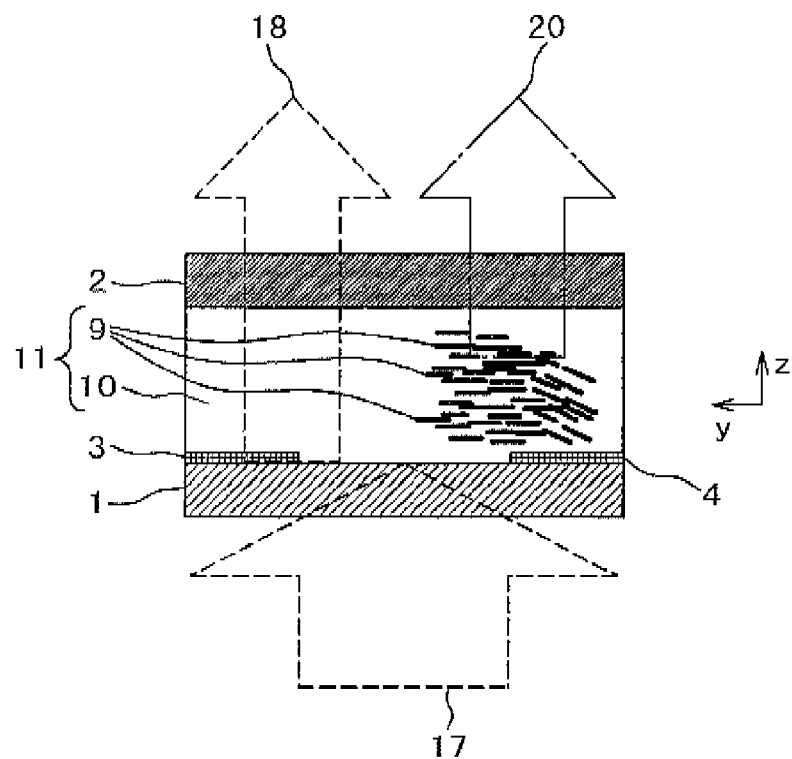
FIG. 11 is a diagram showing the optical path of incident light on the SPD of the first embodiment during the light control period.

FIG. 10 shows the MD 8 in a state during the light control period. The light control particles 9 are affected by AC voltage $V_{AC}1$ and are continuously changed from an unregulated state to a state in which they are oriented along the direction of the electric field. At this time, as shown in FIG. 11, the state of transmission of incident light 17 changes, but light 20 transmitted on the Y-electrode 4 side shows a low transmittance with the state in which the light control particles 9 are localized on the Y-electrode 4 side maintained. The transmittance of the light 20 transmitted on the Y-electrode 4 side can be controlled by adjusting $V_{AC}1$.

Thus, the light control device 12 including the SPD of the present embodiment and using the driving method of the present embodiment can control optical properties between the electrodes. Namely, it can control an arbitrary low-transmittance area, i.e. a light blocking area, and an arbitrary high-transmittance area, i.e. a light transmitting area.

Second Embodiment

In the light control device of the first embodiment, AC voltage $V_{AC}1$ during the light control period is equal to or higher than $V_{AC}h$, that is, high enough to cause the light control particles 9 to be adequately oriented, and the light control particles 9 are, as shown in FIGS. 10 and 11, kept in a state in which they are affected by an AC electric field and oriented along the direction of the electric field. In that state, compared with a state in which the light control particles 9 are randomly arranged, some light leaks to outside. In such a state, there can be cases in which contrast cannot be secured. There is also a different aspect. Namely, in an area where the light control particles are localized, when non-polarized light enters the SPD, a component orthogonal to the direction of the AC electric field of linearly polarized light can be outputted from an arbitrary area making use of the oriented light control particles.

Figure 12:
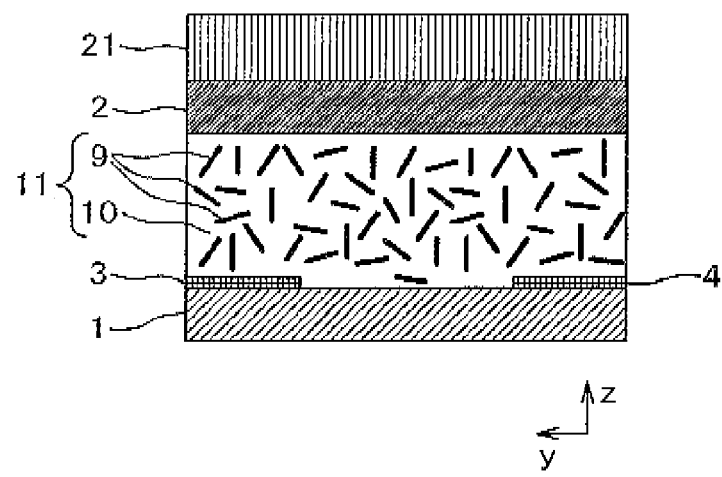
FIG. 12 shows, based on a y-z plane sectional view of an electrode pair shown in FIG. 1, an essential portion of an SPD according to a second embodiment.

A suspended particle device according to a second embodiment of the present invention has a structure which addresses the above problem and which can make use of the above feature. According to the second embodiment, the SPD 8 is further provided with a polarizer 21 as shown in FIG. 12. As for the SPD 8, the driving method, and the drive 16, description already provided in connection with the first embodiment will be omitted in the following.

FIG. 12 is a sectional view, like FIGS. 2A to 2C, in a y-z plane perpendicular to the driving electrode pairs and shows the SPD 8 and the polarizer 21 in an assembled state. In the present embodiment, the transparent supporting base is made of glass. The transparent supporting base may be made of a transparent resin film which preferably has, like glass, a low birefringence, for example, a sheet of cyclo-olefin polymer (COP).

The polarizer 21 is disposed on the SPD 8 with its absorption axis extending in parallel with the driving electrode pairs 5, that is, perpendicularly to the direction of the electric field. The polarizer 21 is a polarizing filter in which polyvinyl alcohol (PVA) contains a uniaxially oriented iodine complex and which is shaped like a sheet using, for example, triacetylcellulose (TAO). The polarizer 21 may also be a polarizing filter in which PVA contains not an iodine complex but a dichroism pigment. Or, the polarizer 21 may be replaced by a liquid crystal element provided with a drive.

Figure 13:
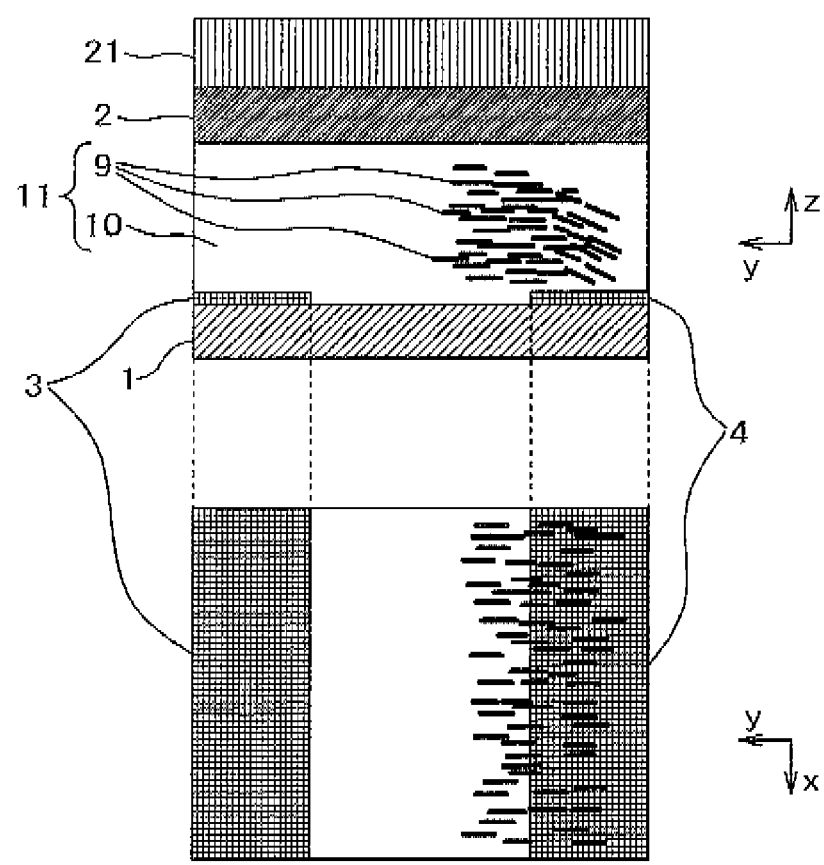
FIG. 13 is a diagram showing an internal state of the SPD of the second embodiment during a light control period.
Figure 14:
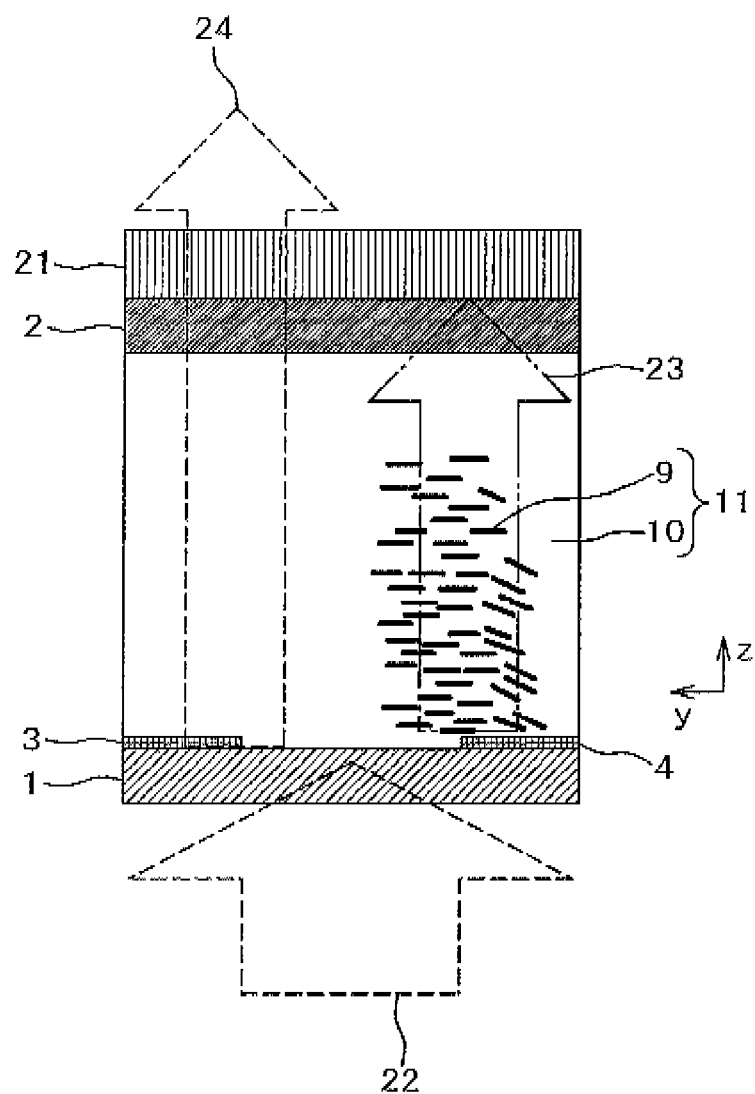
FIG. 14 is a diagram showing the optical path of incident light on the SPD of the second embodiment during the light control period.

The driving cycle used in the driving method for the SPD 8 according to the present embodiment is, like in the first embodiment, composed of an aperture area control period, a light control period, and a reset period, FIGS. 13 and 14 illustrate the movement of light control particles and light control operations taking place in the SPD when the driving method according to the present embodiment is used.

FIG. 13 shows the SPD 8 in a state during the light control period. As shown, the light control particles 9 are affected by the AC electric field and are kept in a state, changed to from an unregulated state, in which the light control particles 9 are oriented along the direction of the electric field. Therefore, in an area where the light control particles 8 are localized, when non-polarized light 22 enters the SPD 8 as shown in FIG. 14, linearly-polarized light 23 is outputted from the SPD 8. The absorption axis of the polarizer 21 disposed on the SPD 8 extends orthogonally to the direction of the electric field (driving electrode pairs). Hence, the linearly-polarized light 23 outputted from the SPD 8 is absorbed by the polarizer 21 disposed on the SPD 8. Namely, in the area where the light control particles 9 are localized, i.e. on the Y-electrode 4 side, the linearly-polarized light 23 is absorbed and blocked.

Figure 15:
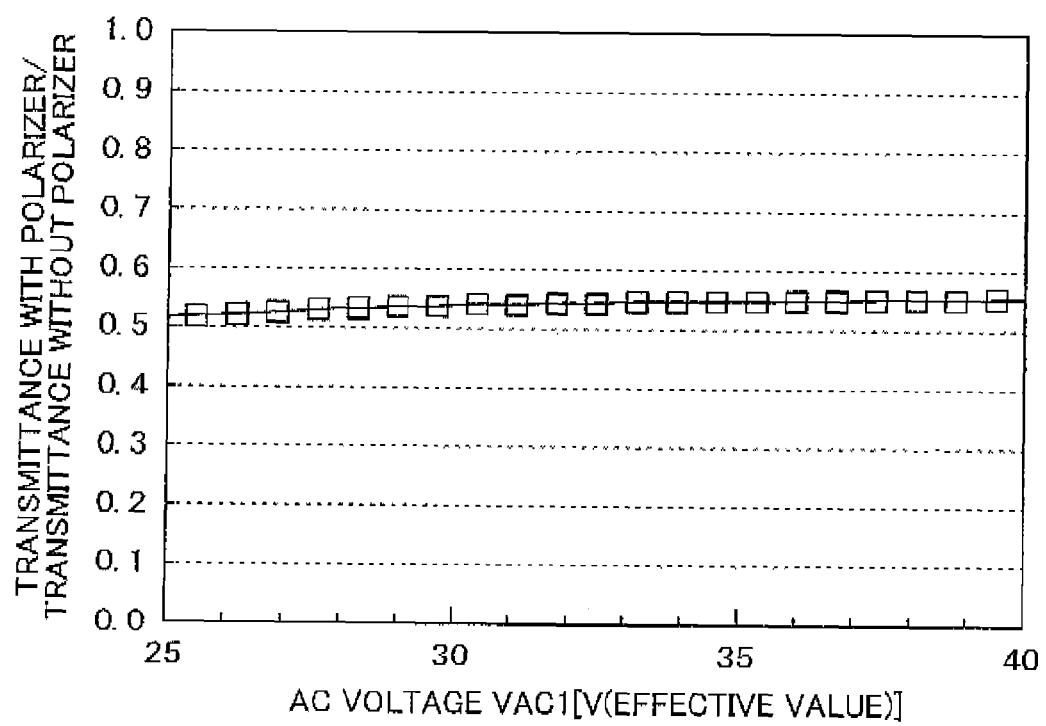
FIG. 15 is a graph showing the ratio between transmittance with a polarizer provided and transmittance with no polarizer provided in the SPD of the second embodiment.

FIG. 15 shows comparison between transmittance with a polarizer provided and transmittance with no polarizer provided. Namely, in FIG. 15, the vertical axis represents the ratio of the transmittance with a polarizer provided to the transmittance with no polarizer provided, i.e. (transmittance with a polarizer provided)/(transmittance with no polarizer provided). The ratio of light absorption depends on the transmittance of the polarizer 21, the concentration of the light control particles 9 used in the SPD 8 and the structure of the SPD 8. In the present embodiment, the transmittance is about half that observed when no polarizer is provided. In the present embodiment, there are almost no light control particles 9 on the X-electrode 3 side, so that, even though light 24 transmitted on the X-electrode 3 side causes linearly polarized light to be generated at the polarizer 21, the transmittance is extremely higher on the X-electrode 3 side than on the Y-electrode 4 side.

Thus, the light control device 12 of the present embodiment using the SPD 8, the polarizer 21 and the driving method as described above can increase, as compared with the first embodiment, the difference in transmittance between a light blocking area and a light transmitting area, so that area control with a high contrast can be realized.

Figure 16:
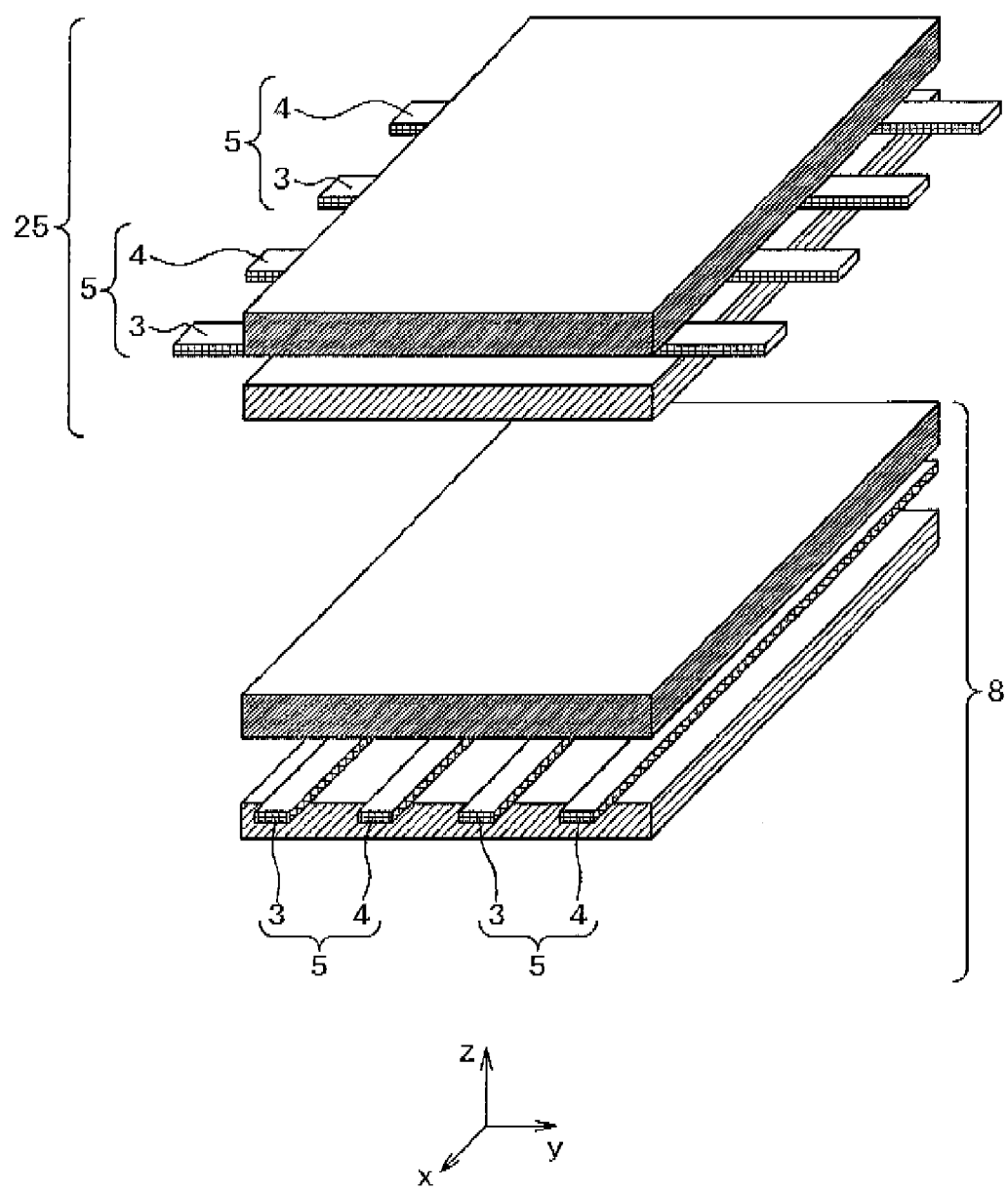
FIG. 16 is an exploded perspective view showing a structure of a light control device including the SPD of the second embodiment in which the SPD of the first embodiment is used as a polarizer.

Referring to FIG. 12, the polarizer 21 is attached on the B-substrate 2 of the SPD 8, but the same effect can be obtained by attaching the polarizer 21 under the A-substrate. The polarizer 21 need not necessarily be attached to a substrate. It may be attached to an incident light source, which is separated from the SPD 8, for generating linearly-polarized light. Also, instead of using the polarizer, the SPD as used in the first embodiment may be used as a polarizing SPD 25 to which an AC voltage $V_{AC}$h is applied and which is oriented to face the SPD 8 such that the driving electrode pairs 5 of the two SPDs extend to be mutually orthogonal as shown in FIG. 16.

Description has been provided above in terms of one pair of X-electrode 3 and Y-electrode 4, but similar effects can also be obtained using plural pairs of X-electrodes 3 and Y-electrodes 4 arranged in parallel. Namely, using many pairs of X-electrodes 3 and I-electrodes 4 arranged in parallel makes light control over a wider area possible.

Even though, in the foregoing, the light control particles 9 are described as having optical anisotropy, the light control particles 9 does not necessarily have to be optically anisotropic. They may be, for example, charged spherical particles having prescribed charging characteristics, Namely, light control can be effected by applying a DC voltage across electrodes for a prescribed amount of time to localize the charged spherical particles and by subsequently applying an AC voltage to maintain the localized state of the particles.

The light control device according to the present invention can be suitably used in various applications, for example: building materials such as indoor and outdoor partitions, window shades and window glasses/sky light windows for buildings; window materials for aircraft, automobiles, railroad vehicles and ships; electronic devices such as displays, optical shutters and polarizing devices; and optical devices such as glasses/sunglasses and mirrors. Plural light control devices according to the present invention may be combined for use, or such a light control device may be used in combination with a different device, for example, an LCD display.

What is claimed is:

1. A suspended particle device comprising:
a pair of substrates disposed to face each other;
a suspension filled between the pair of substrates, containing a disperse medium and charged particles having optical anisotropy; and
an electrode pair formed on the suspension side of one of the pair of substrates;
wherein the suspended particle device is configured to enable the application of a DC voltage across the electrode pair;
wherein the suspension and the charged particles are configured such that when the DC voltage is applied across the electrode pair, the charged particles in the suspension localize at an area near one of the electrodes of the electrode pair, thereby performing light control;

wherein the suspended particle device is configured to enable the application of an AC voltage across the electrode pair, subsequent to the application of the DC voltage;

wherein the suspension and the charged particles are configured such that when the AC voltage is applied across the electrode pair, subsequent to the application of the DC voltage, the charged particles localized at an area near the one of the electrodes of the electrode pair reorient in a common direction, while maintaining the localized area of the charged particles.

2. The suspended particle device according to claim 1, wherein the charged particles and the disperse medium differ in specific permittivity.

3. The suspended particle device according to claim 1, wherein the charged particles are rod-shaped and have an aspect ratio in a range of 5 to 30.

4. The suspended particle device according to claim 1, wherein, when an AC voltage is applied across the electrode pair, light incident on the suspension is polarized by the charged particles.

5. The suspended particle device according to claim 1, wherein a frequency of the AC voltage is 16 Hz or higher.

6. The suspended particle device according to claim 1, wherein the optical anisotropy is caused by a shape of the charged particles.

7. The suspended particle device according to claim 1, further comprising:
a second pair of substrates, disposed to face each other;
a second suspension filled between the second pair of substrates, containing a disperse medium and charged particles having optical anisotropy; and
a second electrode pair, formed in a direction orthogonal to the electrode pair, on the suspension side of one of the second pair of substrates;
wherein the suspended particle device is configured to apply a DC voltage across the second electrode pair, thereby localizing the particles near one of the electrodes of the second electrode pair and thereby performing light control, and configured to subsequently apply an AC voltage across the second electrode pair, thereby maintaining the localized state of the localized particles and thereby controlling the oriented direction of the charged particles near one of the electrodes of the second electrode pair.

8. The suspended particle device according to claim 1, further comprising:
another pair of substrates, disposed to face each other;
another suspension filled between the another pair of substrates, containing a disperse medium and charged particles having optical anisotropy; and
another electrode pair, formed in a direction orthogonal to the electrode pair, on the suspension side of one of the another pair of substrates;
wherein the suspended particle device is configured to apply a DC voltage across the another electrode pair, thereby localizing the particles near one of the electrodes of the another electrode pair and thereby performing light control, and configured to subsequently apply an AC voltage across the another electrode pair, thereby maintaining the localized state of the localized particles and thereby controlling the oriented direction of the charged particles near one of the electrodes of the another electrode pair.

9. A suspended particle device comprising:
a pair of substrates disposed to face each other;
a suspension filled between the pair of substrates, containing a disperse medium and charged particles having optical anisotropy; and
an electrode pair formed on the suspension side of one of the pair of substrates;
wherein an outer side of one of the pair of substrates is attached with a polarizer;
wherein the suspended particle device is configured to apply a DC voltage across the electrode pair, thereby localizing the charged particles near one of the electrodes of the electrode pair and thereby performing light control, and configured to subsequently apply an AC voltage across the electrode pair, thereby maintaining the localized state of the localized charged particles and thereby creating a polarization effect in the suspension in an area where the charged particles are localized, with an absorption axis thereof aligned in a prescribed direction, and the absorption axis of the suspension and an absorption axis of the polarizer being orthogonal to each other.

10. The suspended particle device according to claim 9, wherein a frequency of the AC voltage is 16 Hz or higher.

11. A suspended particle device, comprising:
a pair of substrates disposed to face each other with a suspension containing charged particles and a disperse medium filled therebetween and with an electrode pair formed on the suspension side of one of the pair of substrates;
wherein the charged particles have optical anisotropy;
wherein an outer side of one of the pair of substrates is attached with a polarizer;
wherein light control is effected by applying a DC voltage across the electrode pair, thereby localizing the charged particles near one of the electrodes of the electrode pair, and subsequently applying an AC voltage across the electrode pair, thereby maintaining the localized state of the localized charged particles; and
wherein, in a state with the AC voltage applied, the suspension in an area where the charged particles are localized has a polarization effect with an absorption axis thereof aligned in a prescribed direction, and the absorption axis of the suspension and an absorption axis of the polarizer are orthogonal to each other.

* * * * *